United States Patent
Meister et al.

(10) Patent No.: US 11,693,636 B2
(45) Date of Patent: Jul. 4, 2023

(54) STATIC VERSIONING IN THE POLYHEDRAL MODEL

(71) Applicant: Reservoir Labs, Inc., New York, NY (US)

(72) Inventors: Benoit J. Meister, New York, NY (US); Adithya Dattatri, Newark, DE (US)

(73) Assignee: Reservoir Labs Inc., San Diego, CA (US)

( * ) Notice: Subject to any disclaimer, the term of this patent is extended or adjusted under 35 U.S.C. 154(b) by 46 days.

(21) Appl. No.: 17/526,611

(22) Filed: Nov. 15, 2021

(65) Prior Publication Data
US 2022/0229641 A1    Jul. 21, 2022

Related U.S. Application Data

(60) Provisional application No. 63/138,124, filed on Jan. 15, 2021.

(51) Int. Cl.
*G06F 8/41* (2018.01)
*G06N 3/08* (2023.01)
*G06F 8/71* (2018.01)

(52) U.S. Cl.
CPC ............. *G06F 8/43* (2013.01); *G06F 8/71* (2013.01); *G06N 3/08* (2013.01)

(58) Field of Classification Search
CPC .............. G06N 3/08; G06F 8/71; G06F 8/43
See application file for complete search history.

(56) References Cited

U.S. PATENT DOCUMENTS

| 10,922,315 | B2 * | 2/2021 | Jeong | G06F 16/24 |
| 2009/0083724 | A1 * | 3/2009 | Eichenberger | G06F 8/447 717/160 |
| 2018/0101370 | A1 * | 4/2018 | Huang | G06F 8/447 |

OTHER PUBLICATIONS

Athanasios Konstantinidis, "Source-to-Source Compilation of Loop Programs for Manycore Processors" (Year: 2013).*
Giacomo Aloisi, "OPoly: an OpenMP polyhedral compiler" (Year: 2020).*
Adamski et al., "Polyhedral Source-to-Source Compiler" (Year: 2016).*
Lazcano et al., "Runtime Multi-versioning and Specialization inside a Memoized Speculative Loop Optimizer" (Year: 2020).*
Ginsbach et al., "CAnDL: A Domain Specific Language for Compiler Analysis" (Year: 2018).*

* cited by examiner

*Primary Examiner* — Phillip H Nguyen
(74) *Attorney, Agent, or Firm* — Seyfarth Shaw LLP

(57) ABSTRACT

An approach is presented to enhancing the optimization process in a polyhedral compiler by introducing compile-time versioning, i.e., the production of several versions of optimized code under varying assumptions on its run-time parameters. We illustrate this process by enabling versioning in the polyhedral processor placement pass. We propose an efficient code generation method and validate that versioning can be useful in a polyhedral compiler by performing benchmarking on a small set of deep learning layers defined for dynamically-sized tensors.

16 Claims, 11 Drawing Sheets

Algorithm 1 Informing the mapper

```
procedure SPECIALIZE(G, C)
    Let G' be a clone of G
    Intersect the context of G' with C
    if G' is a bad specialization then
        return
    else if parent P of G exists and is a dedicated GDG then
        Set dedicated GDG D to P
    else
        Create a dedicated GDG D
        Create a new SpecializeOp s and add it to D
        Add G to the family of specialized GDGs in s
        if parent P of G exists then
            Set parent of D to P
            Remove G as a subGDG of P
            Add D as a subGDG of P
        end if
        Set parent of G to D
    end if
    s ← SpecializeOp of D
    Add G' to the family of specialized GDGs in s
    Set parent of G' to D
    Tell mapper to map G'
end procedure
```

FIG. 1

Algorithm 2 Tree generation procedure TREE-GEN(*activeCtxs, availCstrs, isTrue, ptNode*)
    if *activeCtxs.size* > 1 then
        $c \leftarrow diffCstr(availCstrs, activeCtxs)$
        assert $c$ exists
    else
        if exists $c$ that includes context in *activeCtxs* then
            $c \leftarrow cstrIncludeCtx(availCstrs, activeCtxs)$
        else        ▷ FnCall node case
            $g \leftarrow ctxToGDG(activeCtxs.get())$
            $fnCallNode \leftarrow$ new $FnCall(isTrue, g)$
            assert $ptNode\ != null$
            $ptNode.addChild(fnCallNode)$
            return $fnCallNode$
        end if
    end if
    $includedCtxs \leftarrow ctxsIncludedBy(c)$  ▷ subset of *activeCtxs*
    $cndNode \leftarrow$ new $Cnd(isTrue)$  ▷ Cnd node case
    $cndNode.addCstr(c)$
    if $ptNode\ != null$ then
        $ptNode.addChild(cndNode)$
    end if
    $availCstrs.remove(c)$
    $activeCtxs.remove(includedCtxs)$
    TREE-GEN(*includedCtxs, availCstrs,* True, *cndNode*)
    if *activeCtxs* is not empty then
        TREE-GEN(*activeCtxs, availCstrs,* False, *cndNode*)
    end if
    $availCstrs.add(c)$
    return $cndNode$
end procedure

FIG. 2

Algorithm 5.1: Affine Approximation Phase I

Input: $S(X) \geq 0$, $\ell$, $\epsilon$ (threshold distance), $tmax$ (threshold number of additional points to sample) and $C$ (context)

Output: $\mathcal{B}$ $\mathcal{B}^{(1)} \leftarrow \bot$ /* empty polyhedron initialization */;
$\psi^{(1)} \leftarrow (-\epsilon \leq f(X) \leq 0) \wedge C$;
$k \leftarrow 1$;
while *exists a model $m$ of $\psi^{(k)}$ and $k < \ell$* do
    $\mathcal{B}^{(k+1)} \leftarrow \mathcal{B}^{(k)} \sqcup \{m\}$ /* polyhedral join */;
    $\psi^{(k+1)} \leftarrow \psi^{(k)} \wedge \neg \mathcal{B}^{(k)}$ /* blocking clause */;
    $k \leftarrow k + 1$;
end
while *exists a model $m$ of $\psi^{(k)}$ and $k < \ell + tmax$* do
    for *each constraint $c$ of $P^{(k)}$* do
        if *$m$ is not a model that satisfies $c$* then
            $c' \leftarrow shift(c, m)$ /* shift constraint $c$ to include $m$ */;
            $\mathcal{B}^{(k+1)} \leftarrow replace(\mathcal{B}^{(k)}, c, c')$ /* replace $c$ with $c'$ */;
            $\psi^{(k+1)} \leftarrow \psi^{(k)} \wedge \neg \mathcal{B}^{(k)}$;
        end
        else
            $\mathcal{B}^{(k+1)} \leftarrow \mathcal{B}^{(k)}$;
            $\psi^{(k+1)} \leftarrow \psi^{(k)}$;
        end
    end
    $k \leftarrow k + 1$;
end
$\mathcal{B} \leftarrow \mathcal{B}^{(k)}$;
return $\mathcal{B}$;

FIG. 3

Algorithm 5.2: Affine Approximation Phase II

Input: $\mathcal{B}$ (from Phase I), $\mathcal{S}$
Output: $\mathcal{P}$
$\mathcal{S} \leftarrow$ uniform random sample of points in $\mathcal{B}$;
$\mathcal{P}_{prev} \leftarrow \bot$ /* initialize to empty polyhedron */;
$\mathcal{P} \leftarrow \mathcal{B}$;
fix an enumeration of constraints of $\mathcal{P}$;
while $\mathcal{P}_{prev} \neq \mathcal{P}$ do
    $\mathcal{P}_{prev} \leftarrow \mathcal{P}$;
    for $q = 1, \ldots, m + \ell$ do
        $R \leftarrow get\_constraint(\mathcal{P}^{(-q)}, \mathcal{S})$;
        /* *add* is equivalent to replacing $q^{th}$ constraint of $\mathcal{P}$ with $R$ */;
        $\mathcal{P}' \leftarrow add(\mathcal{P}^{(-q)}, R)$;
        if *improve*($\mathcal{P}', \mathcal{P}, S$) then
            $\mathcal{P} \leftarrow \mathcal{P}'$;
        end
    end
end
return $\mathcal{P}$;

FIG. 4

STATIC VERSIONING IN THE POLYHEDRAL MODEL

CROSS-REFERENCE TO RELATED APPLICATIONS

This application claims priority to and benefit of U.S. Provisional Patent Application No. 63/138,124, titled "Static Versioning in the Polyhedral Model," filed on Jan. 15, 2021, the entire contents of which are incorporated herein by reference.

GOVERNMENT LICENSING RIGHTS

This invention was made with government support under Award Nos. DE-SC0017071, DE-SC0018480, and DE-SC0019522, awarded by U.S. Department of Energy, Office of Science, Office of Advanced Scientific Computing Research. The government has certain rights in the invention.

FIELD

This disclosure generally related to facilitating parallelization, data-locality maximization, data lay-out transformation and compilation-resource consumption tradeoffs and, in particular to compile-time versioning of source code, to facilitate such tradeoffs.

BACKGROUND

Versioning has been used before in the context of polyhedral compilation, but in a different manner and for different goals from the techniques and their goals described below.

Raising

One known technique may de-flatten one-dimensional arrays that are accessed through polynomial functions of the loop counters and size parameters into multi-dimensional arrays with affine access functions. This process generates affine conditions on the parameters for the de-flattening to be applicable. When these conditions are not met at run-time, an unoptimized version of the function is selected. Practically speaking, the affine conditions become part of the context of a generalized dependence graph (GDG) associated with the optimized function. This context is then unmodified by the mapping process.

Polyhedral JIT

In one approach to using the polyhedral model in a Just-In-Time manner, to reduce JIT code generation time, code templates called code bones are generated at compile-time and executed speculatively. These templates may be considered versions of the code, which are selected as a function of a run-time polyhedral dependence test, and from which the actual optimized code may be generated and JITed.

PolyJIT may take a more direct approach to polyhedral Just-In-Time (JIT) compilation, by detecting non-polyhedral functions that become polyhedral when some of its parameters are instantiated. A polyhedral compilation (e.g., using Polly) may then be triggered at run time for new instances of these parameters. Metaphorically, versions produced by the PolyJIT mechanism may correspond to equalities in the context of the GDG associated with the function. This system may work well when a limited number of combinations of the versioned parameters are used at run time, which amortizes polyhedral compilation times over the number of executions of the function.

Nested Conditional Optimizations

Some techniques have tackled this issue in the general context of control flow optimization of arbitrary programs. The optimization of nested conditionals can be particularly critical in reverse if-condition. Optimal ordering of conditionals can also be informed by execution traces, as in profile guided optimizations.

SUMMARY

Various embodiments discussed below evaluate a given source code and identify a portion thereof, e.g., a loop nest, the execution of which may depend on one or more variables (also called parameters), where the values of one or more of the parameters may become known only at runtime, and are not known statically, at compile time. The source code or its identified portion is transformed into an internal representation (IR) (e.g., a GDG) used in polyhedral compilation. Thereafter, different versions of the IR are generated, each having a different context. A context can represent the constraints to be enforced during subsequent polyhedral compilation. These constraints may direct the polyhedral compiler to perform various tradeoffs such as parallelization vs. maximization of data locality; data-layout transformation (e.g., to improve cache performance) vs. parallelization; data locality optimization vs. utilization of available processors, etc.

Since the different versions of the IR have different contexts or constraints, the subsequent polyhedral compilation of each version can explore a different tradeoff. For example, one version may favor sequential execution while the other may favor a parallelized execution. Alternatively, two versions may both parallelize the code to be executed but the distribution of the operations allocated to different processors may be different. One version may employ loop tiling, e.g., to improve cache performance while the other may not. Different combinations of such optimizations may also be explored across different versions.

In order for the subsequent polyhedral compilation to explore a wide range of tradeoffs, the respective constraints that are provided to each version are designed to be non-overlapping or distinct. These constraints are based on the expected values the different parameters may take on at runtime.

Accordingly, in one aspect, a method is provided for compiling source code that may facilitate tradeoffs between parallelization, data-locality, and/or data-layout transformation, by versioning source code at compile time. The method includes performing by a processor the step of receiving and transforming source code that includes one or more run-time-determinable parameters into a base internal representation (IR) of a polyhedral compiler. The method also includes creating several dedicated versions of the base IR, where each dedicated version includes a respective context. Each respective context may represent a distinct respective combination of potential values of the parameters. Additionally, the method includes generating a respective source code version corresponding to each dedicated version of the base IR, and deriving a wrapper function for conditionally invoking the respective source code versions.

The source code may include a loop nest. A particular one of the one or more run-time-determinable parameters can be a bound of a loop in the loop nest or a memory access variable specified in the loop in the loop nest. The base IR may include a generalized dependence graph (GDG). In some embodiments, creating the several dedicated versions of the base IR includes creating a tree of several different GDGs.

In some embodiments, for a particular dedicated version of the base IR, a corresponding context representing a corresponding combination of the potential values of the parameters may include one or more constraint functions. A constraint function may be specified in terms of the potential values of one or more of the parameters. In some embodiments, the method may further include linearizing the constraint function via affine approximation. Alternatively or in addition, the method may further include linearizing the constraint function using an artificial neural network trained for polyhedral smoothing.

To conditionally invoke a particular source code version, the wrapper function may be configured for evaluating at runtime the combination of potential values of the parameters. The combination of the potential values of the parameters may be represented as a solution to a set of affine functions. Evaluating the combination of potential values of the parameters at runtime may include evaluating each affine function in the set at most once.

In another aspect, a system is provided for compiling source code, that may facilitate tradeoffs between parallelization, data-locality, and/or data-layout transformation, by versioning source code at compile time. The system includes a first processor and a first memory in electrical communication with the first processor. The first memory includes instructions that, when executed by a processing unit that includes one or more computing units, where one of such computing units may include the first processor or a second processor, and where the processing unit is in electronic communication with a memory module that includes the first memory or a second memory, program the processing unit to receive and transform source code that includes one or more run-time-determinable parameters into a base internal representation (IR) of a polyhedral compiler.

The instructions also program the processing unit to create several dedicated versions of the base IR, where each dedicated version includes a respective context. Each respective context may represent a distinct respective combination of potential values of the parameters. The instructions further program the processing unit to generate a respective source code version corresponding to each dedicated version of the base IR, and to derive a wrapper function for conditionally invoking the respective source code versions. In various embodiments, the instructions can program the processing unit to perform one or more of the method steps described above.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIG. 1 depicts a procedure for providing information to a mapper in a polyhedral compiler to perform versioning, according to one embodiment;

FIG. 2 depicts a procedure for generating a tree of structures of source code (the structures may be called generalized dependence graphs (GDGs)), different structures corresponding to different generated versions of the source code, according to one embodiment;

FIG. 3 depicts a procedure for phase one of linearization of non-linear constraints to be provided to a polyhedral compiler to perform versioning, according to one embodiment;

FIG. 4 depicts a procedure for phase two of linearization of non-linear constraints to be provided to a polyhedral compiler to perform versioning, according to one embodiment;

DETAILED DESCRIPTION

Introduction

Figure 5:
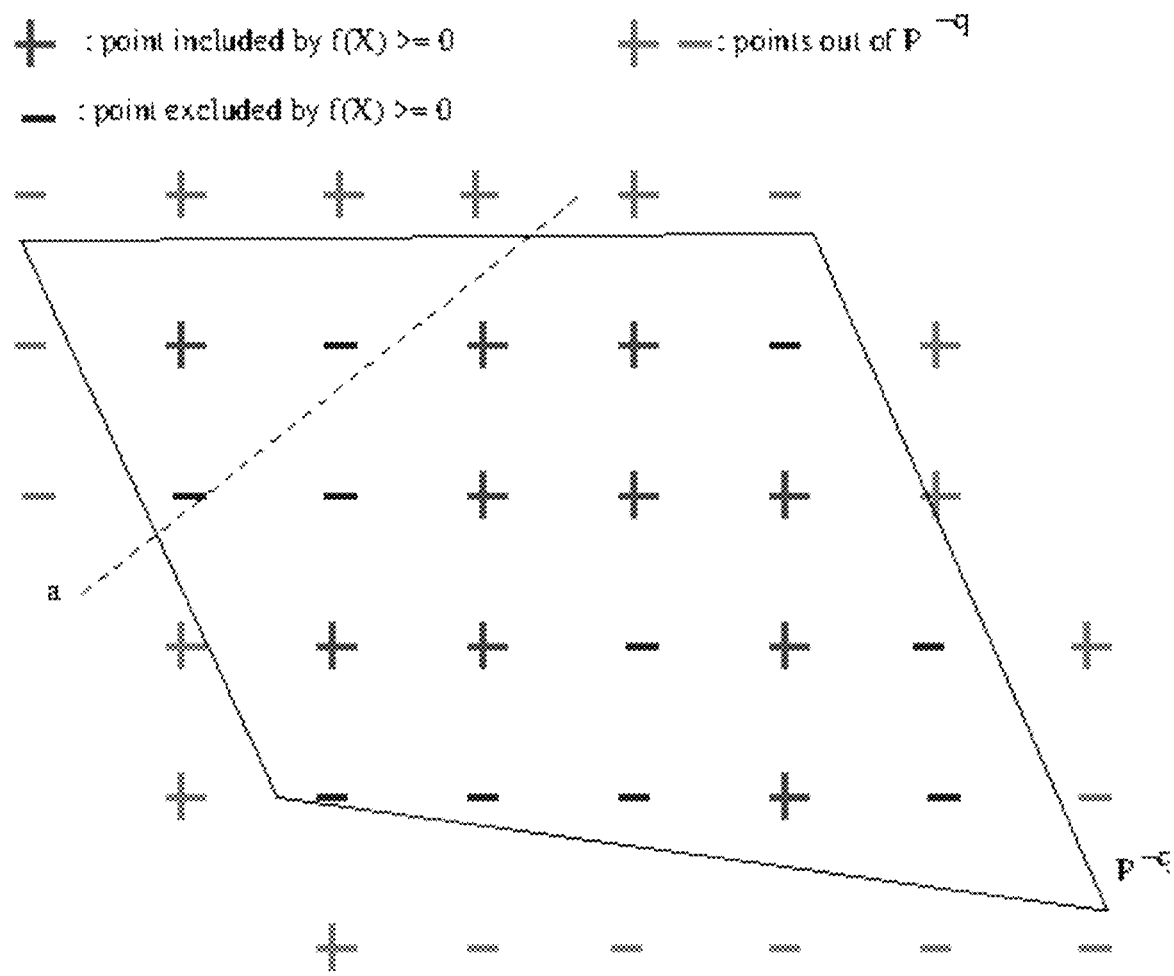
FIG. 5 schematically depicts an exemplary linearization of constraints.

Polyhedral compilers can realize powerful optimizations and parallelization of loop-based programs by deriving a polyhedral representation of the loop code, performing intricate mathematical operation on that representation, and then rendering the transformed polyhedral representation as code. The final code can be rendered in a parallel programming language (e.g., C with OpenMP or pthreads, CUDA) or in a compiler's internal representation, from which scalar, single-thread optimization is performed.

Modern compilers are able to leverage optimization opportunities arising under specific run-time conditions by generating a variety of optimized code variants, and informing the runtime of when to use each variant. This process is called versioning (or sometimes multi-versioning). A typical example is when alias analysis is unable to statically disambiguate two pointers.

The compiler may detect that if said pointers were not aliased, more instructions could be run in parallel. If this is the case, the compiler may insert code that performs a run-time non-aliasing test, uses the optimized code when the test holds, and uses the unoptimized code otherwise.

While versioning has been used by compilers, including in the polyhedral raising phase, to the best of our knowledge, techniques to employ versioning in the mapping phase, where versioning can achieve significant tradeoffs between parallelization, data-locality maximization, and/or data layout transformation, have not been explored. Polyhedral mapping is the process of reordering operations and data in a loop-based computation to produce an optimized sequence and mapping said computation, targeting a particular computer hardware platform. We describe an implementation of versioning in the R-Stream™ polyhedral compiler and discuss how we enabled the processor placement pass to use it. Here, mapping or processor placement generally refers to assigning operations of different processing units for execution thereof. The techniques described herein are not limited to R-Stream, and can be implemented in any polyhedral compiler.

1.1 Application Domain

The need for versioning appeared important to us while mapping deep learning codes. Tensor sizes are dynamic in some neural networks (as for instance where a variable number of objects can be detected), and it seems worthwhile to adapt the polyhedral optimization strategy for layers that access these tensors as a function of the run-time tensor sizes. Hence, while versioning may be useful in other application domains, we use deep learning layers to illustrate the utility of versioning in a polyhedral compiler.

1.2 Model of an Optimized Code Region

To simplify the discussion, we assume, without loss of generality, that the loop code region modeled by a polyhedral representation is outlined into a function. This way, we can refer to the optimized code region as a function and its live-in and live-out values as the function's formal parameters. By the same token, we are looking at applying versioning to the values of the function's formal parameters.

After outlining is done, we consider programs with at least one function with parameters (also called arguments) (e.g., a pointer, an integer, or a floating-point number) that satisfy either of the following conditions:
 At least one argument of the function is defined by a run-time value.
 The function is called with varied values for at least one argument.

We note that recursive functions, which can be generated from polyhedral programs, almost always satisfy both conditions. However, in our experiments we choose to focus on deep learning layers, which are, in our experience, rendered as non-recursive.

1.3 Versioning Approach

Typically, versioning occurs in (at least) one of three places:
 Prior to compilation, the user can incorporate knowledge about the run-time values of the function arguments into the program logic for consideration by the polyhedral compiler. In R-Stream, this is explicitly supported for users through a special pragma annotation.
 Just-in-time (JIT) compilation creates versions of code regions, in which the function arguments are fixed to frequently-used values. However, the type of versioning performed at run-time compilation is limited by the need to minimize compilation time. Hence, versions would be determined by the run-time values of the function arguments. Furthermore, polyhedral compilation is generally considered too slow to be used in a JIT context.
 In ahead-of-time compilation, the compiler generates code for a function with numerical arguments that conditionally executes optimized and parallelized code upon checking the run-time argument values.

1.4 Overview

In the discussion below, we provide an ahead-of-time approach to versioning programs or source code in the polyhedral model. In our approach, we attempt to make minimal assumptions about the implementation and design details of the underlying polyhedral compiler infrastructure. Hence, we anticipate that any polyhedral compiler can be reasonably extended to support our approach to versioning. Having successfully implemented our versioning approach in R-Stream, we describe the salient issues and suggest how to address these in the relevant sections.

We first provide an overview of polyhedra in the context of polyhedral compilation, to understand the rest of the discussion, in Section 2. The motivation for versioning is discussed in Section 3. Then, we detail our approach to polyhedral versioning in Section 4. Section 5 describes linearization of non-linear constraints derived from the parameters, the values of which may not be known at compile time, and would be known only at runtime. We validate the need for versioning experimentally and its impact on compilation time in Section 6, using a few examples of the source code for deep learning, as the code to be compiled and optimized for execution.

2 Overview of Polyhedra in Polyhedral Compilation

This section offers an overview of the main concepts needed to understand the technical description of the polyhedral versioning approach presented here.

2.1 Polyhedra

In a vector space V, a polyhedron $P \subseteq V$ is the set of solutions to a set of linear inequalities $$P: Ax + b \geq 0, x \in V \quad (2.1)$$

Geometrically, Equation (2.1) defines P as the intersection of finitely many half-spaces in V given by the rows of A. A finite polyhedron is called a polytope.

It is possible to consider a subset of the dimensions of V as special variables, which do not get instantiated. Such variables are called the parameters of the polyhedron. For example, let us consider a parametric polytope example below, which has two variables (i,j) and two parameters (n, m):

$$Q(i,j) = \{(i,j) \in \mathbb{Z}^2 : 0 \leq i \leq n; 0 \leq j \leq m\} \quad (2.2)$$

Q is the set of lattice points of the rectangle whose lower left and top right corners are at (0,0) and (n, m), respectively. As hinted in Equation (2.2), in the polyhedral model of loops, we are often interested in integer-valued points inside polyhedra.

2.2 Automatic Optimization Flow

In the polyhedral model of compilation, typically there are three main phases: raising, mapping and lowering. The raising phase translates the program from the input form to a polyhedral intermediate representation (IR). Typically, the program source code is transformed into a base IR. The mapping phase performs the optimizations and parallelizations, termed mapping decisions, on the base polyhedral IR of the program. The part of the polyhedral compiler that performs the mapping phase is termed the (polyhedral) mapper. Finally, the lowering phase translates the mapped program from the polyhedral IR to the output language, e.g., C, C++, etc. Thus, a typical polyhedral compiler is a source-code to source-code compiler that transforms the originally specified source code into a modified source code that is optimized for one or more of parallelized execution, data locality, cache performance via data layout transformation(s), etc. The modified source code may be compiled using a traditional compiler to obtain a executable.

2.3 Polyhedral IR

The base polyhedral IR represents an approximation of the input code that uses affine expressions and leads to safe dependencies. The polyhedral IR, such as that used by R-Stream, may be based on Generalized Dependence Graph (GDG).

The polyhedral model focuses on the optimization of nested loop code that typically operate on multi-dimensional arrays. Hence, loop iteration domains and array access functions are first-class elements of polyhedral representations. A loop nest generally includes several loops that are partially or entirely nested within one or more outer loops. A single loop may also be referred to as a loop nest. GDG vertices represent polyhedral statements, which define an iteration domain, an operation performed for each iteration of the iteration domain, and a set of functions used to access data usually represented as multi-dimensional arrays, though one-dimensional arrays may also be accessed in some cases. GDG edges represent pairwise dependence relationships between polyhedral statements (vertices). We distinguish two types of polyhedral statements here:

ClientOps represent operations in the input function, associated with their polyhedral iteration domain and the array access functions involved in said operations. The semantics of a function raised into a GDG are fully captured by a set of ClientOps.

PseudoOps are operations introduced by the mapper to express a parallel mapping of code. Examples include direct memory access (DMA) transfers, barriers, thread spawning, asynchronous scheduling of a task, function calls and others.

Each raised function in the input IR is initially represented in the polyhedral IR as one GDG. The mapping process transforms the GDG, often with relation to a hierarchy of GDGs, where each GDG is analogous to a function. The GDG hierarchy can take the form of a general graph (since recursive calls form cycles), but there is always a root GDG, without predecessors, for each input function. Calling the input function is equivalent to calling the root GDG.

Since the GDG hierarchy shape is largely that of a tree, we refer to the source of an edge in the GDG hierarchy as a parent GDG. The destination of an edge in the GDG hierarchy is called a sub-GDG. The function arguments (if any) of an input function become the GDG parameters. The iteration domain and array access functions of polyhedral statements may be functions of the GDG parameters. Each GDG defines a polyhedral domain of the GDG parameter values for which the GDG is "valid." This validity domain can represent preconditions to the function or simply the set of values for which the polyhedral statements' iteration domains are not all empty. We refer to a GDG's validity domain as the GDG's context throughout the discussion below.

As an example, consider the loop nest below:
for i=1 to m
  for j=1 to n $$X[i+k][j+l]=A[i][j]*B[i-k][j]$$

In this example, which is illustrative only and not limiting, the variables m and n define loop bounds which, in turn, determine the trip count for the loop operations. The variable k and l determines data access (also referred to as array access). Suppose the value of l can be determined at compile time, but the values of m, n, and k can be determined only at runtime. In that case, m, n, and k are parameters.

Expressions such as m, n, (m+2n+5) (though the last one is not used in the example code above) are examples of affine functions. m<32, m<1000, n≥100 are examples of affine constraints. The constraints themselves can be Boolean-valued functions. The context specified for an IR (e.g., a GDG) is the set of parameter values for which all the constraints of the context are true. In particular, a context for a GDG may be specified as the constraints m<32 and n≥100. The compilation of that GDG would then explore optimizations under the assumption that the values of the parameters m and n satisfy the specified constraints. Another version of the GDG may be created, but with a different constraint m<1000. Here, the compilation of this version of the GDG would explore potentially different optimizations under the assumption that the values of the parameter m satisfies the different specified constraint.

Motivation

TensorFlow is one of the leading Deep Learning research frameworks. Users can use it to compose Deep Learning models, train them, and finally deploy them for inferencing. As part of an effort to optimize inferencing by these models, we built the very first polyhedral deep learning optimizer by creating a TensorFlow front-end to R-Stream. This exposed us to models that repeat the use of some layers with varying input tensor sizes (e.g., a family of residual neural nets). In some cases, these sizes are fixed and known at the compile time, which allows the mapper in R-Stream (a polyhedral compiler, in general) to know everything about the iteration domains and access functions of the polyhedral statements representing the layers at compile time. We observed that R-Stream's polyhedral mapper made different mapping decisions for different input sizes.

However, another set of neural networks use and produce tensors whose sizes are only known dynamically, e.g., an object-detection net that may be used for autonomous driving, where the detection networks may detect a variable set of objects, depending upon the input image. In these cases, some of the tensor sizes will be unknown at compilation time, and they have to be treated as parameters in the polyhedral IR.

Still, we want the mapping decisions to internalize the tensor sizes, even though the mapper may not know much about the particular run-time tensor sizes. The next section presents our approach to solving this problem using versioning.

4 Approach

A naive approach would be to enumerate all possible values of the parameters and optimize the code for each of them. Without prior knowledge about the run-time values, this is not efficient let alone practical, since this approach could generate unreasonably large amounts of code or a GDG's context can be unbounded.

Instead, we divide the space of all collections of parameter values into finitely many ranges. Then we let the mapper generate mapping decisions for each range. Because the context of a GDG is defined to be a polyhedron, we restrict our focus to ranges that are polyhedral domains. Our approach to versioning can be realized as the answers to the following questions:

How to inform the mapper to incorporate a given context sub-domain into its mapping process? (Section 4.1)

How to auto-generate the useful context sub-domains? (Section 4.2)

How to generate the subsequent versioned code? (Section 4.3) The answers to these questions are detailed below.

4.1 Informing the Mapper

In this section, we define the way in which a mapper is informed to version its mapping decisions for a GDG (an IR, in general) towards a given set of affine constraints over its parameter values.

We define the following notions that are used for informing the mapper: specializing a GDG, specialized GDG, family of specialized GDGs, SpecializeOp and dedicated GDG. In our approach, when the mapper is provided a GDG and an extra set of affine constraints over the its parameter values to consider, the mapper clones the GDG and adds the constraints to the clone GDG's context, which will be used to make mapping decisions. Since this particular way of versioning forms a subset of the original context, we refer to this cloned GDG as a specialized GDG and the process itself as specializing a GDG. Specializing a specialized GDG is possible and well-defined. A family F of specialized GDGs is a maximal set of GDGs where either of the following conditions exclusively holds for G'∈F:g:

1) ∃G∈F, G≠G', G' is a specialized GDG generated by specializing G
2) G' is the unique GDG in F which is not a specialized GDG, or equivalently, the first specialization in the family started by specializing G'

A SpecializeOp is a PseudoOp whose sole purpose is to maintain the set of GDGs in a family of specialized GDGs. A dedicated GDG (a dedicated version of the base IR, in general) is a GDG that is created by the mapper and contains exactly one SpecializeOp; together these form the mapper state that keeps track of the versioning. A dedicated GDG will be the parent GDG (in the GDG hierarchy) of all the GDGs in the family of specialized GDGs, which is given by the SpecializeOp contained in the dedicated GDG. Having defined these notions, we provide the SPECIALIZE procedure (FIG. 1) that precisely gives our approach. SPECIALIZE takes as input a GDG G and a set of affine constraints C.

A specialized GDG is a bad specialization if its context is empty or if there already exists a version of this GDG with the same context. Mapping an extra GDG G' requires extra work from the mapper, in terms of processor cycles and time, memory usage, and energy consumption. Since the requirement of these resources, especially polyhedral mapping time, can be non-trivial, an important trade-off between compilation time and optimization potential exists. If some mapping passes have already occurred on G when SPECIALIZE is called, two options are available.

Repeating all the mapping steps on G' can enable more optimization, especially if the behavior of these previous steps is conditioned by the context, but it also likely doubles the compilation time of G. Conversely, starting the mapping process for G' at the beginning of the step that called SPECIALIZE introduces only a fraction of the total mapping time for G', but may miss some optimization opportunities.

Since each polyhedral pass that uses versioning can split the context of the input GDG in two or more sub-domains, the number of specialized GDGs can grow exponentially with the number of such passes. To limit the risk of an exponential compilation time blowup, the default behavior of SPECIALIZE is the latter.

We note that it is not necessary to create a custom-polyhedral statement if it is not supported by the polyhedral compiler infrastructure. The families of specialized GDGs can be maintained in other parts of the mapper state.

4.2 Generating Versioning Constraints

Each polyhedral pass whose behavior is determined by parameters, e.g., the size of iteration domains along certain dimensions, or the way array access references relate to each other, is a candidate for versioning. We illustrate polyhedral versioning on the placement pass, because its behavior varies strongly as a function of the iteration domain sizes. Because it is a fairly unsophisticated pass, our discussion can remain centered on versioning itself. Versioning as described herein can also be employed in other passes of polyhedral compilation.

The goal of placement is to define, for each polyhedral statement, a function from its iterations (i.e., any point of its iteration domain) to processor coordinates. The R-Stream machine model represents processing entities in a multi-dimensional hyper-rectangular grid. Hence, placement functions typically have as many dimensions as the targeted processor grid that may include several processors. Let Pl be the placement function of statement op. For any value of the parameters $N \in \mathbb{Z} Z^p$, iteration $I \in \mathbb{Z}^n$ of op gets executed by processor x=Pl(I, N).

With the OpenMP target (as one nonlimiting example), the default placement heuristic in R-Stream enumerates the loop dimensions of the polyhedral statements and tries to select the outermost loop dimension. A major test that determines the behavior of placement is checking whether a placement function would occupy the whole processor grid. We call this the occupation test. The test holds when the loop dimension considered for placement to a given processor grid dimension is large enough, i.e., when its trip count is at least the size of the targeted processor grid dimension. When this test fails, the pass declines to distribute the loop across the targeted processor grid dimension and tries the next inner eligible loop, by default.

Unfortunately, when a loop's trip count depends upon GDG parameters and when the context does not bound these parameters, the occupation test is undecidable. Before versioning was introduced, our placement pass made the unchecked assumption that the parameters are large enough for the occupation test to be true. With versioning, we can make this assumption explicit, by creating a version where the assumption is not met.

Because the trip count of a loop often varies as a function of outer loop dimensions, occupation tests can be defined and used alternatively. For instance, we could decide that the average trip count must occupy the grid dimension, or weighted averages among the statements sharing the loop, or the maximum, etc. While several of these tests are available from the placement pass, we chose to use the maximum in some cases. The maximum trip count may be obtained by computing parametric bounding box of the loop's trip count domain and taking the difference (plus one) between the upper and lower bound of the bounding box.

Another parameter of the placement pass is its "occupancy," which defines the number of loop iterations per processor (along a given processor grid dimension). In other words, occupancy defines a multiplication factor of the targeted grid size to be used by the occupation test.

If c is the occupancy, placement will generally decline to distribute a loop if its trip count is less than c times the targeted processor grid size. The user might set the occupancy to ½ to use only half the processors. On the other hand, the user may require at least 2 iterations of the given loop per processing element by setting the occupancy to 2. When placement selects a loop for placement along dimension k of the processing grid, and its trip count is a parametric function t(N), we let placement trigger the mapping of a specialized GDG by calling SPECIALIZE on the current GDG in the placement pass and the following affine constraint:

$$t(N) \leq c \cdot pg(k)$$

where pg(k) is the size of the processor grid along dimension k. This constraint informs the mapper that t(N) is not large enough when mapping the specialized GDG.

4.3 Versioned Code Generation

This section focuses on modifications made to the lowering phase of a polyhedral compiler to generate code for a specializer GDG and in particular its SpecializeOp.

Consider a specializer GDG D with SpecializeOp s. Let n(s) denote the size of the family of specialized GDGs contained in s. Let $\{G_i\}_{i \in [n(s)]}$ denote the family of specialized GDGs in s and let $\{C_i\}_{i \in [n(s)]}$ be the contexts where $C_i$ is the context of $G_i$ with $\#(C_i)$ many constraints. A dedicated GDG will correspond to a function in the lowered program that checks for a specialized GDG's context whose constraints are satisfied by the run-time argument values and calls that function lowered for that specialized GDG.

While there might multiple specialized GDGs G and G' whose contexts the run-time values satisfy, for simplicity, we only enforce that if G' is (transitively) a specialization of G, G' is selected. We note that this design choice does not affect correctness. Allowing overlapping contexts prevents us from computing non-convex, complex contexts, which would result in an explosion of conditionals. Instead, we enforce that only one GDG of a given family is executed for any valid value of the original GDG's parameters using if/else constructs. Here is one approach to generate code for D:

```
if (C₁) {
    call the function lowered for G₁
}
else if (C₂) {
    call the function lowered for G₂
}
.
.
.
```

```
else if (Cₙ) {
    call the function lowered for Gₙ
}
```

With this code, referred to as a wrapper function, there is the possibility of re-evaluating the same constraint more than once across different if-statements when the contexts share constraints. Furthermore, when $G_i$ is called, all contexts $C_j$ for $j \leq i$ need to be checked, which can create a significant overhead.

In some embodiments, we provide a heuristic that generates code for a specializer GDG, and which does not check any constraint more than once for a given set of run-time values, but might check some extra constraints, relative to the constraints of the context of the GDG that the run-time values satisfy. We now proceed to provide details of this heuristic, which may be included in the wrapper function during its generation (also called derivation), where these heuristic would be run after mapping and in the beginning of the lowering phase.

4.3.1 Specialization Tree

Our code generation heuristic involves constructing a specialization tree for each SpecializeOp, which mirrors the structure of a conditionally branched code. We use this rooted-tree directly to generate the code for a single specializer GDG. We define two types of nodes in the specialization tree, namely Cnd and FnCall. We let each Cnd node maintain a set of constraints over the GDG parameters to be lowered into checking a condition over the function arguments and each FnCall node maintain a reference to a specialized GDG, whose corresponding function is to be called.

The leaves of the tree will be of type FnCall and all other nodes will be of type Cnd. Each Cnd node will have between one and two children. If a Cnd has one child, then the child corresponds to the true branch of the conditional. Otherwise, if a Cnd node has two children, there will be a distinguished left and right child, which will correspond to the true and false branches of the conditional, respectively. Both types of nodes maintain a Boolean flag indicating whether it is in a true (nested if) or false branch (same-level else).

4.3.2 Tree Generation

In this phase where the tree is first generated, each of the Cnd nodes of the tree will have only one constraint. We require the following pre-conditions to hold for the SpecializeOp s prior to tree generation:
1) No two contexts of specialized GDGs in s are equal.
2) No specialized GDG in s has an empty context.

To ensure the first condition, for every pair of GDGs that have the same context, we remove one of them from s. To ensure the second condition, we remove GDGs with empty contexts from s.

After the pre-conditions are ensured to hold and prior to tree generation, we also assert that the family of specialized GDGs has at least two specialized GDGs. These steps form our pre-processing. Due to the first condition, each GDG uniquely corresponds to a context.

We now define a recursive procedure TREE-GEN to generate the tree. TREE-GEN takes in four arguments: activeCtxs, availCstrs, isTrue and ptNode.

activeCtxs is a set of contexts (and thereby their corresponding GDGs) that are left to be captured by FnCall nodes. availCstrs is a set of constraints that remain available for use by Cnd nodes; here we treat two constraints as equal if and only if they include the same integer points. isTrue is a Boolean flag that indicates whether the current node being constructed is directly within a true or false branch. Lastly, ptNode is the Cnd node that will be the parent of the current node being constructed. The procedure returns the root node of the specialization tree, which is of type Cnd. In the first call to TREE-GEN (after pre-processing), we set the argument values as follows:

1) activeCtxs: union of the specialized GDG contexts
2) availCstrs: union of all specialized GDG context constraints
3) isTrue: true in our convention, but does not matter for root
4) ptNode: null On a high-level, the TREE-GEN proceeds as follows:

1) When activeCtxs.size>1, pick a differentiating constraint c from availCstrs that differentiates two contexts $C_1$ and $C_2$ in activeCtxs; in other words, c includes either $C_1$ or $C_2$ and does not include the other. Such a c must exist when activeCtxs.size>1 (proved in Lemma 4.1).
2) When activeCtxs.size=1, pick any c from availCstrs that includes a context in activeCtxs. If no such c exists, then bind the specialized GDG corresponding to the one remaining context in activeCtxs to a FnCall node and return the node. Otherwise, proceed with the next steps.
3) Create a Cnd node and add c to the node's set of constraints.
4) Partition activeCtxs into those included (true branch) and not included (false branch) by c. Recursively call TREE-GEN on both of these partitions to build the rest of the specialization tree. We remove c from availCstrs before these sub-calls as it will not be used in the false branch sub-call and should not be chosen again in the true branch sub-call. We add back c after the sub-calls, as it can be used in other parts of the specialization tree. Return the Cnd node created in this call.

We provide representative pseudocode for the specialization tree generation in Algorithm 2 in FIG. 2.

LEMMA 4.1. If activeCtxs.size>1, there exists a constraint in availCstrs that differentiates between two contexts in activeCtxs.

PROOF. Suppose activeCtxs.size>1, but none of the constraints in availCstrs differentiates between two contexts in activeCtxs. Consider two contexts $C_1$ and $C_2$ in activeCtxs, which must be distinct by the pre-processing. There must be a differentiating constraint c that includes either $C_1$ or $C_2$ and does not include the other. c must have been removed in a previous call for which the current call is (transitively) a sub-call of, for otherwise c would be in availCstrs. This implies that c was added to the set of constraints of the Cnd node created in this previous call. However, if this were the case, $C_1$ and $C_2$ would not appear in the same activeCtxs, a contradiction.

Lemma 4.1 shows that the claim made in the first high-level step is well-defined. We now show Lemma 4.2, which implies that for each FnCall node, the corresponding GDG context is equivalent to the intersection of the conditions on the path from the root to the node.

LEMMA 4.2. Given a FnCall node x, for each constraint c of the corresponding GDG context C, there will exist an ancestor Cnd node a that contains c in its set of constraints. Furthermore, if a has a Cnd child node w that is an ancestor of x, then isTrue must be set for W.

PROOF. Suppose that for a FnCall node x, there is some constraint c of the corresponding GDG context C such that no Cnd node ancestor of x contains c in its set of constraints. Now consider the call to TREE-GEN that generates x. c would be in the availCstrs of this call. However, creating a FnCall node only occurs when there are no constraints in availCstrs that cover the one remaining context in activeCtxs, a contradiction. This implies the existence of a Cnd node ancestor a that contains c. Furthermore, if a has a Cnd child node w that is an ancestor of x, the includedCtxs of the call that generates a would contain C and w would be generated in the first sub-call, that is with the isTrue argument set to True.

In Lemma 4.3, we show that for any FnCall node that corresponds to calling the function for a specialized GDG, we do not need to check too many constraints in addition to the constraints of the GDG's context to get to the corresponding function call.

LEMMA 4.3. Let s be a SpecializeOp with family of specialized GDGs $\{G_i\}_{i \in [n(s)]}$ and contexts $\{C_i\}_{i \in [n(s)]}$ where $C_i$ is the context for $G_i$. In the specialization tree for s, the path length from the root to the FnCall node that is associated to $G_i$ is $\leq n(s) + \#(C_i)$.

PROOF. When activeCtxs.size>1, a call partitions activeCtxs into two sets of size at most activeCtxs.size−1. In this way, $\leq n(s)$ calls are required to get $C_i$ to be the only remaining context in activeCtxs. Then we need to generate $\leq \#(C_i)$ many Cnd nodes for the remaining constraints of $C_i$.

Lemma 4.3 also implies that the depth of a specialization tree for s is $\leq n(s) + \max_{i \in [n(s)]} \#(C_i)$. When calling the lowered function for $G_i$, the conditions when our heuristic is guaranteed to beat the simple approach (as far as checking fewer constraints) is given by the following inequality:

$$n(s) + \#(C_i) \leq \sum_{j=1}^{i} \#(C_j)$$

$$\Rightarrow n(s) \leq \sum_{j=1}^{i-1} \#(C_j)$$

We sum over all $i \in [n(s)]$ to arrive at the following inequality:

$$n(s)^2 \leq \sum_{i=1}^{n(s)} \sum_{j=1}^{i-1} \#(C_j) = \sum_{i=1}^{n(s)-1} \#(C_i) \cdot (n(s) - i)$$

When this inequality holds, we use the heuristic over the simple approach. Furthermore, to make the heuristic better, in the first high-level step, we pick the constraint that results in a partition of activeCtxs into sets that are as close to being equal in size as possible. Ideally, if we are able to select a constraint that exactly partitions activeCtxs into equal sized sets in every call to TREE-GEN, then the n(s) in the upper bound becomes $\log_2 (n(s))$, which justifies this additional optimization.

Tree Collapsing

To render the output code more readable and compact, nested if statements (without same-level else statements)

may be collapsed into one if statement that uses a conjunction of the conditionals. While several related simplifications or collapses could be applied, it is not clear that they would actually improve readability. We are not expecting to improve performance here, since the backend compiler will presumably generate equivalent CFGs regardless of whether these extra transformations are performed.

4.4 Process Summary

The technique described above can facilitate tradeoffs between parallelization, data-locality, and/or data-layout transformation by versioning source code at compile time. Different versions of the originally specified program or source code are generated. When compiled by a conventional compiler that generates executable code from source code, these different source code versions may yield different respective executables. All of these executables would perform the same computations specified in the original program or source code. The different executables would be optimized differently, however, in terms of parallelization, data locality, and/or data layouts. As such the run-time performance of a computing system executing these different executables can be different.

The run-time performance may include one or more of the following performance metrics: overall processing time, the number of processor cycles, the required memory footprint, data exchange between a main memory and one or more cache levels and/or between different levels of cache, data exchange between the respective local memories of different processors, utilization of the available processors, and/or power and/or energy consumption of the computing system. At runtime, the values of the parameters based on which the versioning is performed would be known. Therefore, only the version that maximizes the performance according to one or more specified performance metrics may be executed, which can optimize the performance of the computing system.

5. Polyhedral Versioning Based on Non-Linear Domains

5.1 Motivation

Modern compilers are able to leverage optimization opportunities arising under specific run-time conditions by performing compile-time code transformations. This compiler effort is known as versioning or specializing. In this setting, we want to specialize the mapping of GDGs to non-linear domains over its global parameters. Usually, a GDG comes with a linear domain, called its context, which polyhedral mappers use to make mapping decisions. However, the sub-domains of the context introduced by specialization can introduce non-linear constraints into the context. This can occur, for instance, when the specialized domain defines the values of the parameters for which the footprint of the code fits in a particular memory or cache.

There are several ways this issue could be handled. The polyhedral mapper could be modified to handle non-linear constraints, but doing so would definitely make compilation tractability a harder challenge than it already is. Non-linear constraints can trivially guard the execution of a GDG, without incorporating them to the context. However, this would lead to contradictory decisions in the mapper, as in the following example.

Assume that the non-linear constraints restrict the parameters to small values and that the context is unchanged, that is it does not reflect the non-linear constraints in any way. The state of the program as known to the mapper is given by the polyhedral statements and the context. In this case, there is nothing to prevent the mapper from assuming that one or more parameters are large and make mapping decisions that are vastly inconsistent with the non-linear constraints.

Hence, we propose to generate linear constraints that approximate non-linear constraints in a GDG context to avoid inconsistent mapping decisions while maintaining polyhedra as the base representation. In the next section, we define what constitutes a suitable approximation.

5.1 Polyhedral Smoothing

In this section, we define the kind of polyhedral approximation of interest. We express all inequalities in homogeneous form, in which an extra dimension is made to correspond to the scalar factor. Let $X \in \mathbb{R}^n$ and $S(X) \geq 0$ be a system of constraints consisting of m affine inequalities given by $C \cdot X \geq 0$ (i.e. our context) and one non-affine inequality $f(X) \geq 0$ where . denotes matrix multiplication.

Let $\mathcal{S}$ be the set of solutions to $S(X) \geq 0$, and let $\mathcal{B}$ be a domain containing a subset of $\mathcal{S}$; we refer to $\mathcal{B}$ as a "bounding domain" for $\mathcal{S}$. Let $\mathcal{P}$ be an affine approximation defined by a set of affine inequalities $P \cdot X \geq 0$; we also refer to $\mathcal{P}$ as a polyhedral domain. Now we define a quantity called superposition that represents how similar $\mathcal{P}$ and $\mathcal{S}$ are relative to the points in $\mathcal{B}$ that are included/excluded by both sets. The best affine approximation is the one that maximizes superposition with the non-affine domain $\mathcal{S}$, relative to $\mathcal{B}$.

Definition 5.1 The amount of superposition of a polyhedral domain $\mathcal{P}$ and domain $\mathcal{S}$ over $\mathcal{B}$ is defined as:

$$sup_{\mathcal{B}}(\mathcal{P},\mathcal{S}) = \int_{X \in \mathcal{B}} \delta(S(X)) \cdot \delta(P(X)) \tag{5.1}$$

where $$\delta(Y) = \begin{cases} 1 & \text{if } \forall Y_i, Y_i \geq 0 \\ -1 & \text{if } \exists i, Y_i < 0 \end{cases}$$

Here, $sup_{\mathcal{B}}(\mathcal{P},\mathcal{S})$ increases as the number of points of $\mathcal{B}$ that are either in both $\mathcal{S}$ and $\mathcal{P}$ or outside of both $\mathcal{S}$ and $\mathcal{P}$ grows, and decreases as the number of points of $\mathcal{B}$ that are in one of $\mathcal{S}$ and $\mathcal{P}$ but not the other grows. We refer to the maximization of $sup_{\mathcal{B}}(\mathcal{P},\mathcal{S})$ as polyhedral smoothing.

Definition 5.2 A polyhedral $\ell$-smoothing $\mathcal{P}$ of $\mathcal{S}$ over $\mathcal{B}$ is a potentially sub-optimal polyhedral smoothing of $\mathcal{S}$ defined by m+$\ell$) inequalities.

Definition 5.3 An optimal polyhedral $\ell$-smoothing $\mathcal{P}_{opt}$ of $\mathcal{S}$ over $\mathcal{B}$ is a polyhedron $\mathcal{P}$ defined by m+$\ell$) inequalities, which maximizes $sup_{\mathcal{B}}(\mathcal{P},\mathcal{S})$.

$$\mathcal{P}_{opt}(\mathcal{S},\mathcal{B}) = \underset{\mathcal{P}}{\text{argmax}}\left(sup_{\mathcal{B}}(\mathcal{P},\mathcal{S})\right)$$

Since the m affine constraints of the context are already affine, they can be immediately included in $\mathcal{P}$. Hence, the core of the problem is to find $\ell$) additional affine constraints that optimize superposition with $\mathcal{S}$, relative to $\mathcal{B}$. We note here that finding a smoothing is a kind of classification problem, where we are trying to classify a set of points into two classes using a polyhedron, namely the points in $\mathcal{S}$ and the points outside of $\mathcal{S}$.

5.3 Practical Considerations

5.3.1 Bounding Domain in the Polyhedral Model of Loops

When $\mathcal{B}$ is unbounded, the integral defined in Equation (5.1) may not converge. To avoid this problem, we only consider a bounded $\mathcal{B}$ in this discussion. Also, a common assumption in the polyhedral model of loops is that the GDG parameters take on integer values, which translates to $\mathcal{B}$ lying on $\mathbb{Z}^n$.

5.3.2 Tractability

The context of a GDG is a set of constraints on the parameters, which add to the constraints of the iteration domain of each polyhedral statement of the GDG. Since the tractability of polyhedral mapping depends upon the number of constraints in said iteration domains, the ability to bound the number of new constraints (to $\ell$)) is a factor in the overall tractability of the mapping process.

Additionally, we care about the tractability of computing a polyhedral smoothing itself and are willing to trade optimality of a smoothing for speed of computing it. We solve the problem of finding a good smoothing of $\mathcal{S}$ in two main phases:

1) Compute a bounding domain $\mathcal{B}$ for $\mathcal{S}$
2) Compute a polyhedral $\ell$-smoothing P for $\mathcal{S}$ over $\mathcal{B}$ The next section details these steps: first, we compute a polyhedral (implicitly, $\mathbb{Z}$-polyhedral) bounding domain $\mathcal{B}$ using a combination of convex hull and inflation (i.e., outward facet shifting, as in) to include points that are outside but near the edge of $\mathcal{S}$. Then, we introduce "cuts" formed from the constraints of $\mathcal{B}$ (a polyhedron) that maximize a discrete version of the superposition function $\sup_{\mathcal{B}}$ for computational efficiency and well-definedness. We now elaborate on these phases in the subsequent sections.

5.4 Algorithm

5.4.1 Phase I

For both mathematical and computational simplicity, it is preferable that $\mathcal{B}$ has both a simple structure and convenient representation. Hence, we consider $\mathcal{B}$ with the form of a polyhedron. We define a procedure for constructing $\mathcal{B}$. Assuming (efficient) access to points in $\mathcal{S}$ via queries to an SMT solver, the general idea is to 1) Sample "boundary" points of $\mathcal{S}$ and take the convex closure of these points to arrive at a polyhedron
2) Sample additional "boundary" points of $\mathcal{S}$ and apply outward facet shifting to polyhedron (from step 1) to include these points and arrive at $\mathcal{B}$ The first step generates a polyhedron that, in principle, should involve a low number of constraints. Then the second step modifies this polyhedron to include more points while maintaining the same number of constraints. We note that this approach will yield $\mathcal{B}$, a polyhedron that is bounded, regardless of whether $\mathcal{S}$ is bounded or not. To define the boundary points, we consider the following. Let $\epsilon \geq 0$ and consider the family of sets $\mathcal{S}_\epsilon = \{X \in \mathbb{R}^n | f(X) \geq -\epsilon\}$. By definition, $\mathcal{S} = \mathcal{S}_0$ and $\mathcal{S}_\epsilon \subseteq \mathcal{S}_{\epsilon'}$, where $0 \leq \epsilon \leq \epsilon'$. Here, upon fixing $\epsilon$, we can realize $\mathcal{S}_\epsilon \setminus \mathcal{S}$ as the set of boundary points. The pseudocode for the first phase is shown in FIG. 3.

The function shift can be defined as follows. Given an affine constraint $$a \cdot X \leq b$$

where a is a scalar vector and b is a scalar and a point v outside the corresponding affine half-space, the following affine constraint represents a possible shifted affine constraint that includes v and all solutions to the non-shifted constraint $$a \cdot X \leq b + (a \cdot v - b)$$

Thus, the algorithm terminates since all steps terminate and there are a finite number of iterations in each of the loops.

5.4.2 An LP-based alternating method

The goal of this phase is to compute the polyhedral $\ell$-smoothing of $\mathcal{S}$ over $\mathcal{B}$, which was computed in the first phase. We begin this section with some preliminary definitions and notions:

1) Let $\mathcal{S}^+$ be a concatenation of integral points (as columns) in $\mathcal{B} \cap \mathcal{S}$.
2) Let $\mathcal{S}^-$ be a concatenation of integral points (as columns) in $\mathcal{B} \setminus \mathcal{S}$, but negated.
3) Let $\mathcal{S}(\mathcal{S}^+|\mathcal{S}^-)$ be the column-wise concatenation of $\mathcal{S}^+$ and $\mathcal{S}^-$ in matrix form.
4) Given a matrix M, let $M_i$: be the $i^{th}$ row and $M_j$ be the $j^{th}$ column.
5) Given polyhedron $\mathcal{P}$ and a fixed enumeration of constraints of $\mathcal{P}$, let $\mathcal{P}^{(-q)}$ refer to the polyhedron with the $q^{th}$ constraint removed.
6) Given $\mathcal{P} \cdot X \geq 0$ is the matrix form of polyhedron $\mathcal{P}$, $\mathcal{P}^{(-q)}$ refers to the matrix obtained by removing the $q^{th}$ row, and $\mathcal{P}^{(31\ q)} \cdot X \geq 0$ is the corresponding system of constraints.
7) Let inside $(\mathcal{P}^{(-q)})$ refer to the set of column indices of $\mathcal{S}$ that correspond to points of $\mathcal{B}$ that are also in $\mathcal{P}^{(-q)}$.

Since $\mathcal{B}$ (as constructed in the first phase) is a convex closure of finitely many integer points, $\mathcal{S}$ is a finite matrix.

Our method proceeds to compute an $\ell$-smoothing $\mathcal{P}$ by starting with the polyhedron $\mathcal{B}$ and iteratively replacing each of the constraints until no further improvement can result from the replacements. More formally, the approach may be given by the pseudo-code showing in FIG. 4.

Here, add adds the input constraint to the set of constraints defining the input polyhedron to form a new polyhedron. get_constraint generates a constraint by optimizing an LP system. The LP system formulation captures the following intuition:

1) Generate a half-space (i.e. a homogeneous constraint $ax \geq 0$) that contains $\mathcal{P}^{(-q)}$. In other words, the constraints of $\mathcal{P}$ imply the constraint of the half-space.
2) In an effort to maximize superposition, shift $ax \geq 0$ by $\gamma$ to obtain and return a new constraint $a'x \geq 0$. Here, $\gamma \leq 0$ is suitably chosen.

Regarding the first piece of intuition, we use the affine form of Farkas' lemma. In particular, we have $$ax = \lambda \mathcal{P}^{(-q)} x + \beta, \lambda \in \mathbb{Q}^{m+\ell-1} \geq 0, \beta \geq 0 \quad (5.3)$$

We now elaborate on the second piece of intuition. If the shift $\gamma$ is negative, then the resulting half-space will be cutting through the polyhedron $P^{(-q)}$. Now, maximizing superposition is equivalent to maximizing the number of points in $\mathcal{B}$ that are "on the good side" of our constraints. More formally, consider the constraint modified from Equation (5.3) with slack variable $\epsilon_j$ for each column j (i.e. a sample point) of $\mathcal{S}$:

$$aS_j + \gamma = \lambda P^{(-q)} S_{\cdot j} + \beta + \gamma + \epsilon_j \geq 0, \lambda \in \mathbb{Q}^{m+\ell-1} \geq 0, \beta,$$
$$\epsilon_j \geq 0, \gamma \leq 0 \quad (5.4)$$

Intuitively, $\epsilon_j$ provides some leeway for each sample to deviate from the constraints and maximizing superposition corresponds to maximizing the objective function given by the number of constraints with $\epsilon_j$ equal to zero. However, since this objective function is not linear, we minimize the following substitute objective function as a heuristic for maximizing superposition:

$$\min \Sigma_j \epsilon_j \quad (5.5)$$

To avoid creating constraints that are equivalent up to a scaling factor, we also restrict our focus to convex combinations:

$$\beta + \gamma + \Sigma_{k \in [m+\ell-1]} \lambda_k = 1 \quad (5.6)$$

Furthermore, only the points of B that are already in $\mathcal{P}^{(-q)}$ can influence the objective function. Indeed, as illustrated in FIG. 5, adding constraint a' cannot further exclude points that were already excluded by $\mathcal{P}^{(-q)}$ (the lighter shade points in FIG. 5), and it cannot include these points either. Then in Equation (5.4) we can restrict j to values in inside($P^{(-q)}$) to reduce the number of constraints in the LP system. Hence, our LP system is as follows:

$$\begin{cases} \min \sum_{j \in inside(P^{-q})} \epsilon_j & (5.7) \\ \lambda P^{(-q)} S_{\cdot j} + \beta + \gamma + \epsilon_j \geq 0, \forall\, j \in \text{inside}\,(P^{(-q)}) \\ \lambda_k \geq 0, \forall\, k \in [m+\ell-1] \\ \gamma \leq 0 \\ \beta \geq 0 \\ \epsilon_j \geq 0, \forall\, j \in \text{inside}\,(P^{(-q)}) \\ \beta + \gamma + \sum_{k \in [m+\ell-1]} \lambda_k = 1 \end{cases}$$

improve checks if the constraint generated by get_constraint is not already in P and if P' represents a strict improvement in the superposition. If these two conditions hold, then P' is chosen over P; otherwise, P is maintained.

5.4.2.1 Performance-Precision Trade-Off

Again here, since the number of points in $\mathcal{B}$ (within $\mathbb{Z}^n$, that is), even just in $P^{-q}$, can be impractically large, we substitute for $\mathcal{B}$ a uniformly sampled subset of its integer points. The direct effect of such a sampling is a (often dramatic) decrease in the number of columns of S.

5.4.2.2 Complexity Analysis

The LP system has one linear objective function to minimize and the following number of linear constraints:

$$|inside(P^{(-q)})| + m + \ell - 1 + 1 + 1 + |inside(P^{(-q)})| + 1 = 2 \cdot |inside(p^{-q})| + m + \ell + 2$$

We now prove the algorithm terminates, by showing a time complexity bound. Let d be the number of samples. With each iteration of the outer loop, the superposition (over the uniformly sampled subset) must increase by at least one due to the termination condition. This implies, in the worst case, the outer loop must make at most 2|d|+1 many iterations. Letting cost(LP) denote the cost of solving an LP, we have the following time complexity bound for this phase $$\mathcal{O}_{(d(m+\ell)\text{cost}(LP))}$$

5.4.2.3 Guaranteeing P Constraints

It is possible that the optimal value of $\lambda$ found with Equation (5.7) will produce a redundant cut (in which case we have $\beta=0$). The resulting polyhedron will then have less than $\ell$ constraints. This is fine as we only want to limit the number of constraints of the resulting smoothing to m+$\ell$. However, there may be an opportunity to reintroduce extra constraints after more constraints have evolved. To do so, we simply try to find one more optimal cut after a given optimal cut is found, until we cannot find one or we have reached m+$\ell$ constraints.

5.4.2.4 Weighed Search

Using a substitute objective function based on a distance between the constraints of $\mathcal{P}$ and the points of $\mathcal{B}$ make that the original goal of maximizing the points correctly included or excluded becomes a goal of minimizing the sum of distances between the new constraint a and the misclassified (sampled) points of $\mathcal{P}^{-q}$. A pathological case of this substitute goal is when a constraint is chosen that includes one previously misclassified point $f$ that is far from the original constraint, to the expense of excluding several points that were close from the original constraint. In that particular case, the number of misclassified points goes up, and hence superposition goes down, while our substitute superposition objective goes up.

Such bias can be mitigated by trying to direct the search to including regions that include a lot of points of $\mathcal{S}$ and to exclude regions that exclude a lot of points excluded by $\mathcal{S}$. This is done by defining a weight w for each point. This corresponds to the following change of variable:

$$\epsilon_{ij} = w_j \epsilon'_{ij} \quad (5.8)$$

where j is the index of the considered point in $\mathcal{S}$. Points in desirable regions get a higher weight. Injecting Equation (5.8) in the objective function can steer the search toward optimizing the classification of the high-weighted points.

One way to determine weight is to evaluate how many points in the same class are found in the neighborhood of considered point x (e.g., a hypercubic box H(x) centered on x of a given width):

$$w(x) = \frac{\#(H(x) \cap S)}{\#H(x)} \quad (5.9)$$

for points contained in $\mathcal{S}$ and $$w(x) = \frac{\#(H(x) \setminus S)}{\#H(x)} \quad (5.10)$$

for points not contained in 5, where \ represents the set difference operator.

5.5 Polyhedral Smoothing as a Neural Net Learning Problem

Figure 6:
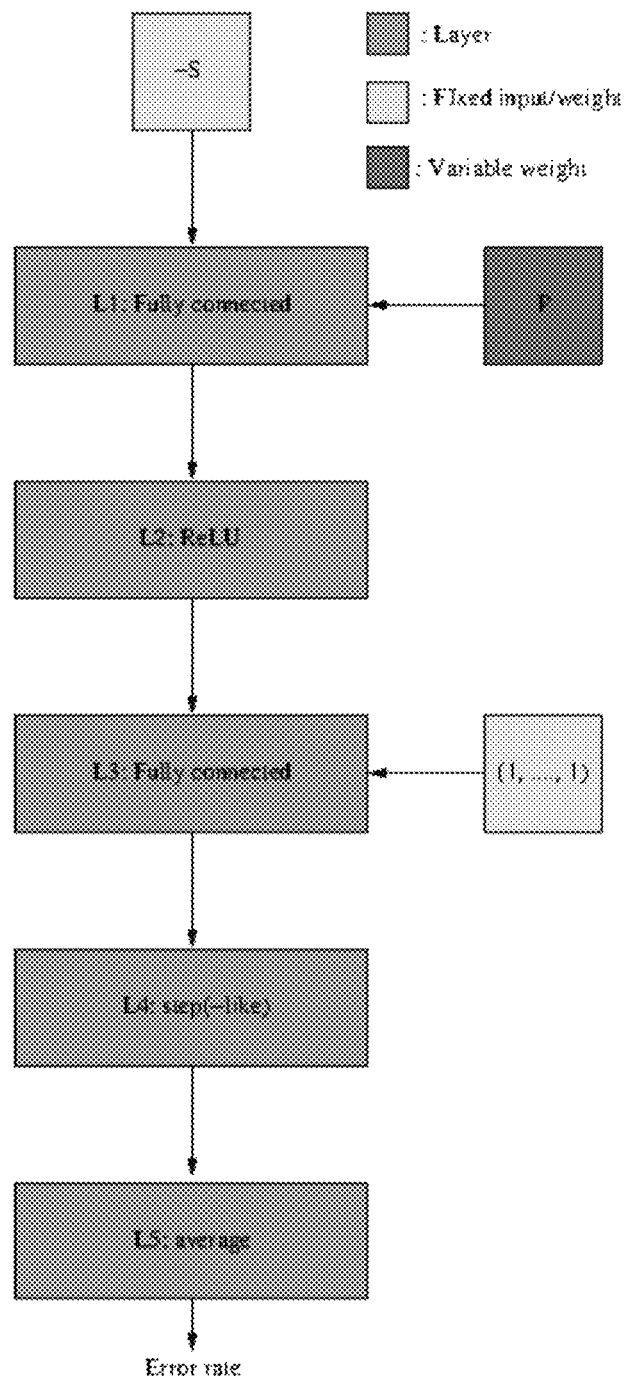
FIG. 6 schematically depicts smoothing of non-linear constraints by training an artificial neural network, according to one embodiment.

The exact objective function for an $\ell$-smoothing of $\mathcal{S}$ used in Section 4.2 is the number of non-negative entries of (P·S). This objective can be expressed with a fairly simple neural network, represented in FIG. 6. P·S is a matrix multiplication, which is modeled as a fully-connected (FC) layer $L_1$. We use −S as the set of input samples, and P is the weight matrix for this FC layer.

The output is a matrix of integer numbers that is positive whenever a sample point is misclassified. By putting this matrix through a ReLU activation function (let us call it $L_2$), we keep the misclassified points (per constraint) into a matrix of the same shape as (P·S). Another layer, $L_3$ takes this matrix of misclassified points per constraint and sums the elements of its columns. The result is a vector that has one element per sampled point.

An element of the vector is positive if and only if a point is misclassified by any constraint of P. $L_3$ can for instance be implemented with a constant-weight matrix of one row and as many columns as the number of constraints in P, and whose elements are all 1. The outputs of L3 are thresholded to 1 using a step-like activation $L_4$. Since both P and S have integer coefficients, the entries of the output vector to $L_4$ are either a 0 or a 1. The error function can then be defined as the ratio of misclassified points, i.e., average value of the elements of the output to $L_4$. We can use any deep learning framework to train this model based on the above error function, and obtain an optimal polyhedral smoothing. The variable of this training is P, which are the coefficients of the constraints of the smoothing $\mathcal{P}$.

5.6 Generalization

6.1 Systems of non-affine inequalities

The algorithms presented above for polyhedral smoothing can be applied to systems with more than one non-affine inequality, for instance by incorporating (and smoothing) one non-affine inequality at a time. One interesting question that rises in this case is, given a budget of l affine constraints to smooth a set of j non-affine inequalities, how many constraints we should allow for each smoothing operation. One way to define such distribution is to interpolate each non-affine inequality with a polynomial. Since it can be expected that higher-degree polynomials will have more inflection points, the number of constraints (k) allowed for each smoothing should be an increasing function of the degree of the interpolated polynomial.

5.6.2 Arbitrary Function and Number of Versions

The same smoothing algorithm, as well as its subsequent versioning can be adapted to handle the case of an arbitrary function within a bounded context. A slightly more general way to perform versioning would be as follows:
Define n versions of a GDG
Define a function p$f$ that maps each point of the context
  to one of the n preferred versions.
for each version k∈[1, n]:
  Use a polyhedral smoothing, such as Algorithm ??, to
    determine the polyhedral specialization context for
    version k within each of the specialization contexts
    for versions [1, k−1].
Function p$f$ can be computed in one of the following
  ways:
running the versions and collecting their run time or a
  combination of their run time and other properties of
  the versions (e.g., code size, power consumption).
evaluating an algorithm that estimates these properties, by
  associating a scalar value to a given (GDG version,
  numerical parameters) pair.

There is a degree of freedom in the order in which the versions are considered in the partitioning algorithm. Partitioning can be done across two subsets of the versions at a time. For instance, we can first generate a specialization context that partitions versions [1, m] from version [m+1, n], where m∈[2, n−1]. Then, we can find a specialization context that partitions the version sets further into two non-empty sets, and so on until all the version sets considered contain only one version. This leads to a decomposition algorithm with $\log_2$ (n) partitions.

6 Results

In this section, we first describe the infrastructure we use for testing as well as the neural network layers we benchmark. Then we describe our benchmarking procedure. Lastly, we show and analyze the performance benefits of versioned code and display the compilation time overhead for our versioning method. We want to compare the behavior of versioned programs with non-versioned ones, for a varying problem size.

6.1 Benchmarking Infrastructure

In Section 6.3, we evaluate the performance benefits of using versioning in the placement pass on three neural network (NN) layers:
  1) a fully connected layer in which the input and output
     sizes are equal (e.g., a square matrix multiplication)
  2) the first convolution of GoogLeNet
  3) a residual NN that uses MaxPooling
Here, a polyhedra compiler that implements versioning as described herein is used to compile the source code associated with the NN and its layers, to build the NN in an efficient manner. In other words, the NN source code is used as an example of the kinds of source codes that can be compiled using embodiments of the polyhedral compiler implementing versioning.

We use parametric versions of these NN codes, in which one or more loop bounds are given by a numerical parameter of the layer function. In the fully-connected, we parameterize on the length of the input vector; we refer to this parameter as Q. In the convolution case, we parameterize on the number of images handled in a single batch; we refer to this parameter as batch. In the last case, we parameterize on the height of the images; we refer to this parameter as height. We note that Q, batch and height are positive integer parameters. We use an empirical upper bound for these parameters, which we derive from bounds used in constant-size versions of the layers. We refer to these parameterized codes as $fc$, convolution_googlenet and maxpool_resnet, respectively.

To benchmark these codes, we embed them into a program with microkernel structure. Here, a microkernel structure includes the code that is embedded in it as well as the following functions: initialize_once, initialize, kernel, check. The kernel method is the main source of program behavior, and in our case, calls the NN code. Furthermore, a microkernel supports running the kernel method for any specified fixed number of trials and specifying run-time parameter values to be used by the kernel method. Both the number of trials and parameter values may be provided via command-line arguments to the microkernel. The execution of a microkernel consists of the following steps:

1) Call the initialize_once function
2) For each trial, do the following:
   a. Call the initialize function
   b. Call the kernel function
   c. Call the check function, which checks if the kernel correctly performed its computation.

Upon finishing a run, the microkernel displays the execution time of the kernel method totaled across all trials. The microkernels are written in C. Our test machine is a Ubuntu 18.04.5 64-bit server that has a Intel Xeon W-2245 CPU @ 3.90 GHz processor, which features one socket, eight cores per socket and two threads per core.

6.2 Benchmarking Procedure

For benchmarking, we restricted our focus to R-Stream's OpenMP backend, which generates C code that features R-Stream-generated optimizations and parallelizations (i.e., OpenMP constructs). In an attempt to make full utilization of our test machine's computational resources, we set OMP_NUM_THREADS to 16.

R-Stream dynamically chooses among a collection of LP solvers at compile-time, which is used to perform various polyhedral tasks. To remove any variability that might arise here, we fix the LP solver prior to compilation to COIN-OR. We fed R-Stream with a machine model that represents the machine with the parameters given by the lscpu tool. gcc is used as the backend compiler to R-Stream with the -march=native —O3—fno-trapping-math options.

For our specific selection of NN codes, R-Stream with versioning enabled generates the following simple conditional branching:

```
if (param ≤ limit) {
    call 1st version of NN code
} else {
    call 2nd version of NN code
}
```

Here, param is a placeholder for Q, batch, and height and limit is a placeholder for a constant that the placement pass chooses based on the processor grid size and the occupancy option (see Section 4.2).

Our test machine has a processor grid with 16 processing elements. For performance benchmarking, we use the following procedure given a fixed NN code's microkernel, occupancy setting and value for param:
1) Compile the microkernel with the fixed occupancy setting using R-Stream with versioning and R-Stream without versioning
2) Run the versioned microkernel with the fixed value for param for five trials (to dampen OpenMP variability)
3) Run the non-versioned microkernel with the fixed value for param for five trials
4) Compute the execution time speed-up.

Regarding occupancy, we toggle between 1× and 2×, which results in 16 and 32 (respectively) for the values attained in place of limit. While the reason for setting 1× occupancy is to maximize processor utilization, the reason for setting 2× occupancy is to leverage the dynamic load-balancing provided by OpenMP.

The set of values for param that we use for a microkernel is given by the following ranges: [1, . . . , limit], eight equally-spaced points in [limit+1, . . . , param] and [limit+1, . . . , 2·limit]. We choose these set of values for param to provide an equal-sized window for running both versions of code, to show how the versioning scales with respect to no-versioning, and to keep the visualization of the results simple.

Here is the formula we use to calculate speed-up:

$$\frac{\text{run time of optimized code w/o versioning}}{\text{run time of optimized code w/ versioning}}$$

6.3 Performance Benchmarking

6.3.1 $fc$

To increase legibility of the speedup results for $fc$, we have split their representation between the Q≤limit and Q>limit ranges. The fully-connected layer (FIGS. 7A through 8B) is the most dramatic of our examples, because placement chooses to not parallelize the code for low values of Q (i.e., Q≤limit) in the specialized version. It is a sobering reminder that parallelizing small matrix multiplications across cores on a cache machine may not always be advisable. The versioning technique described herein can perform such tradeoffs between parallelization, memory-locality maximization, and data-layout transformation.

Figure 7A:
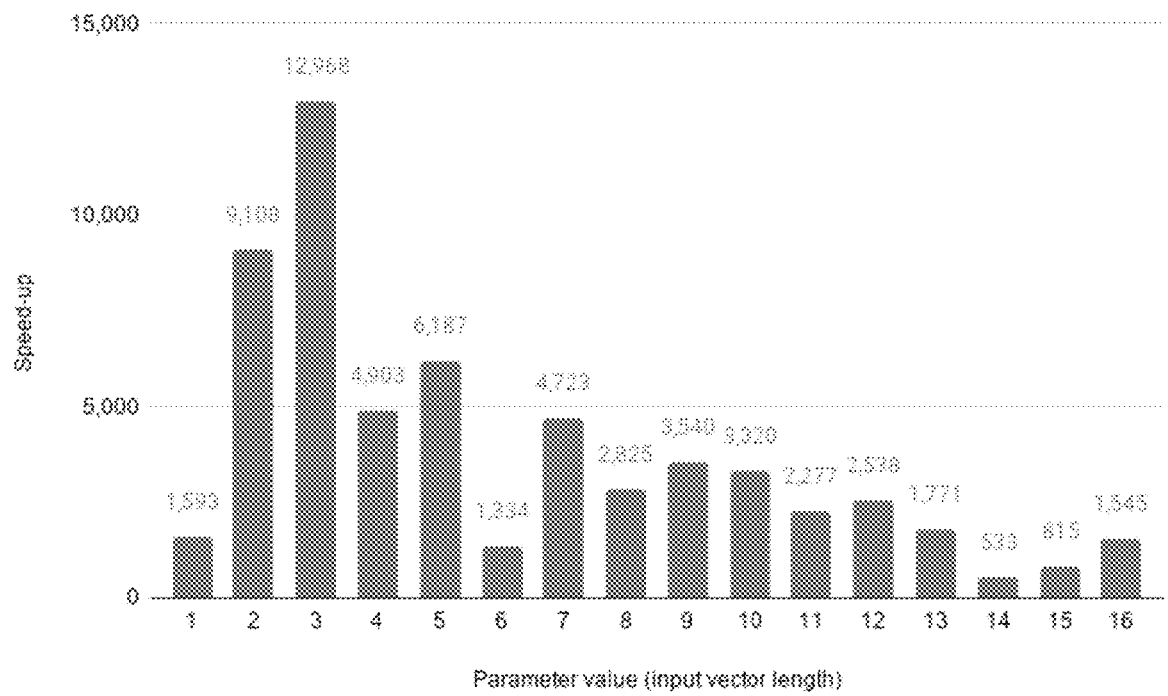
FIGS. 7A and 7B show the speed-up in the execution of an example source code, due to versioning of that source code according to one embodiment.
Figure 7B:
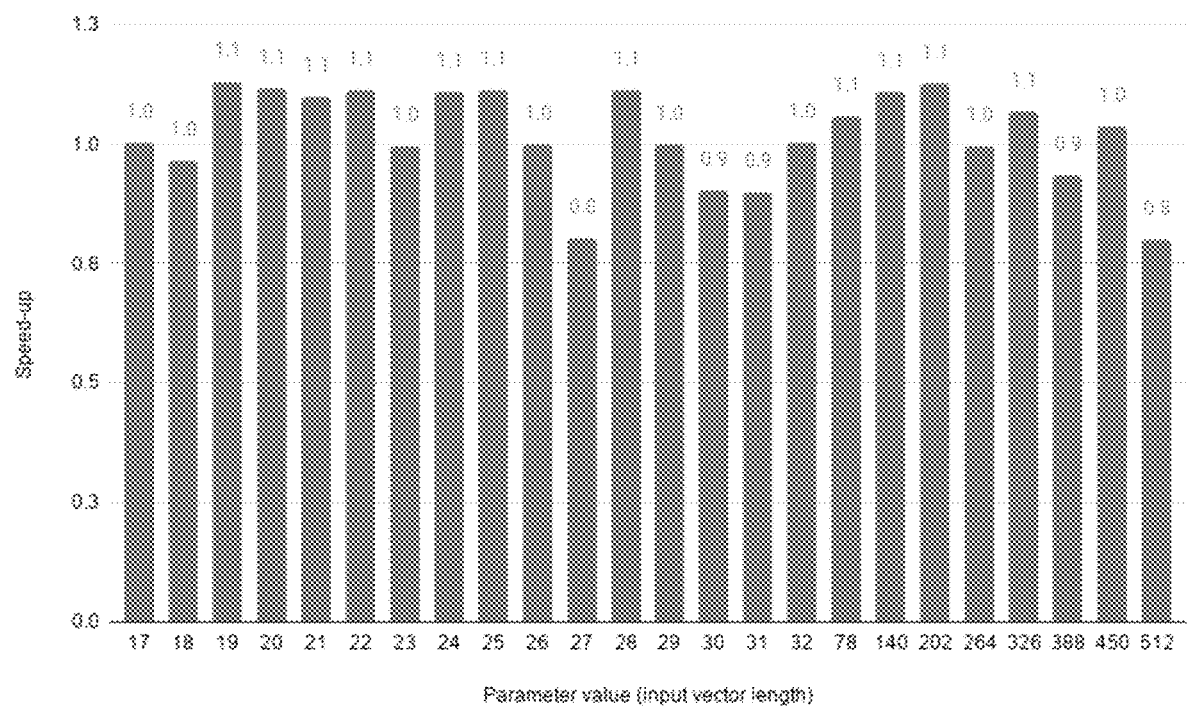
Figure 8A:
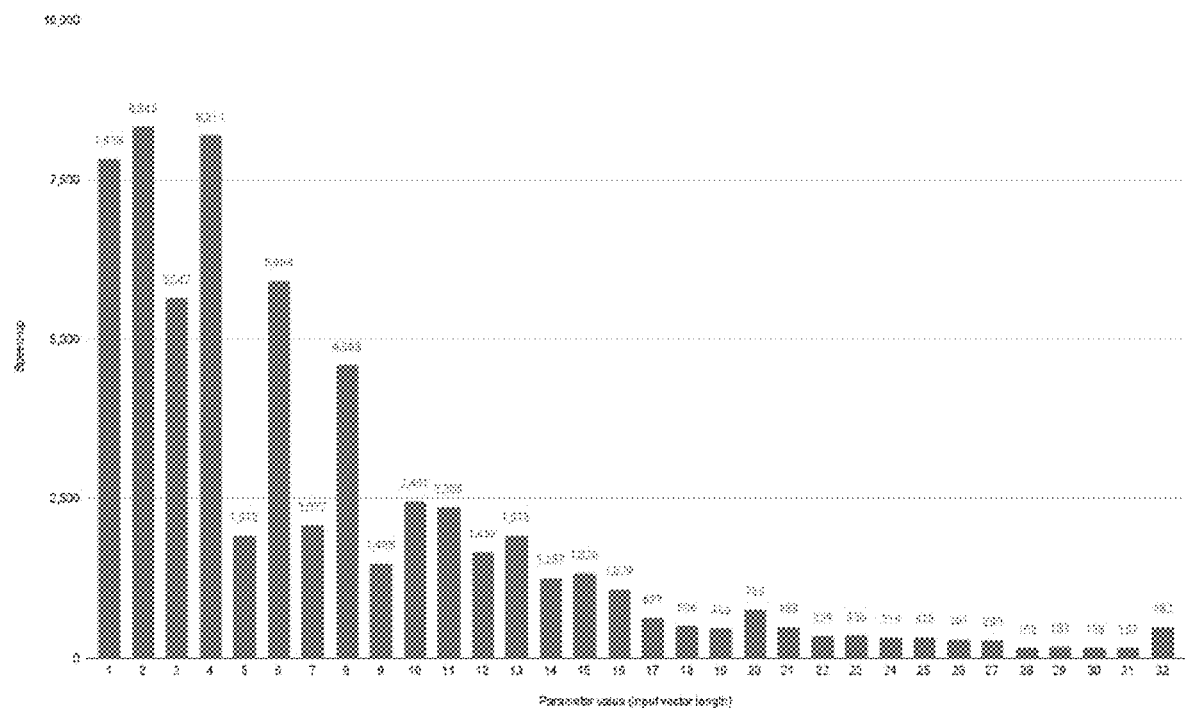
FIGS. 8A and 8B show the speed-up in the execution of the example source code associated with FIGS. 7A and 7B, due to versioning of that source code according to another embodiment.
Figure 8B:
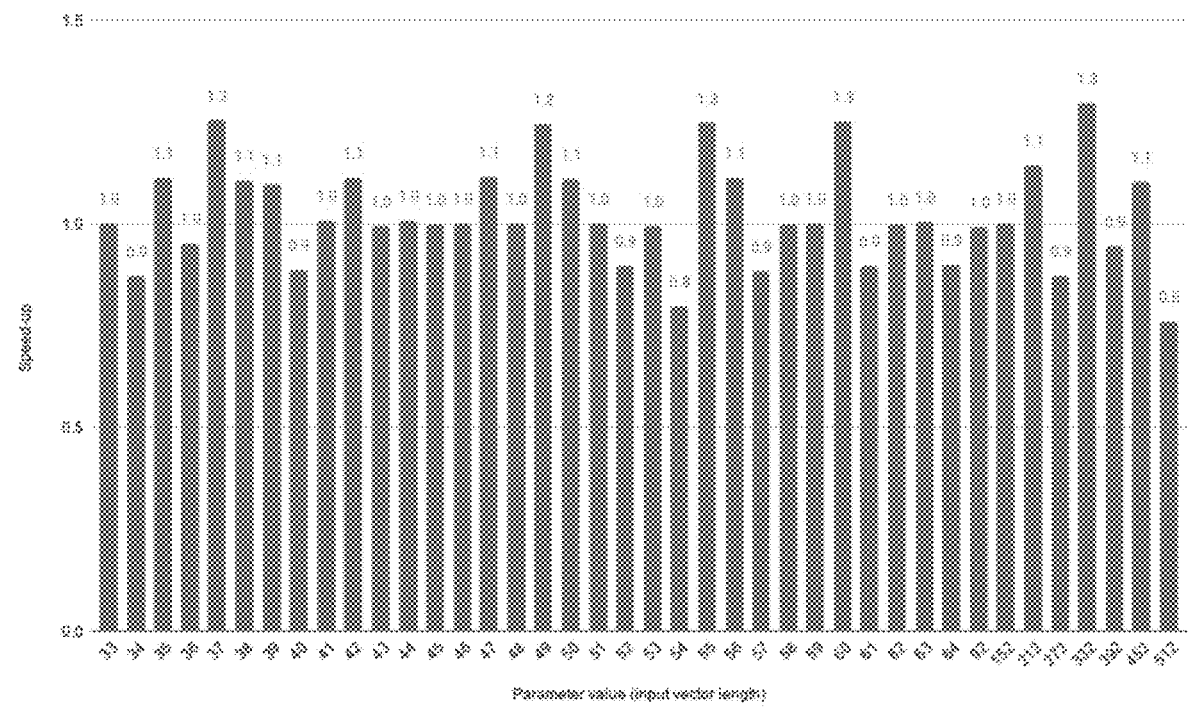
Figure 9:
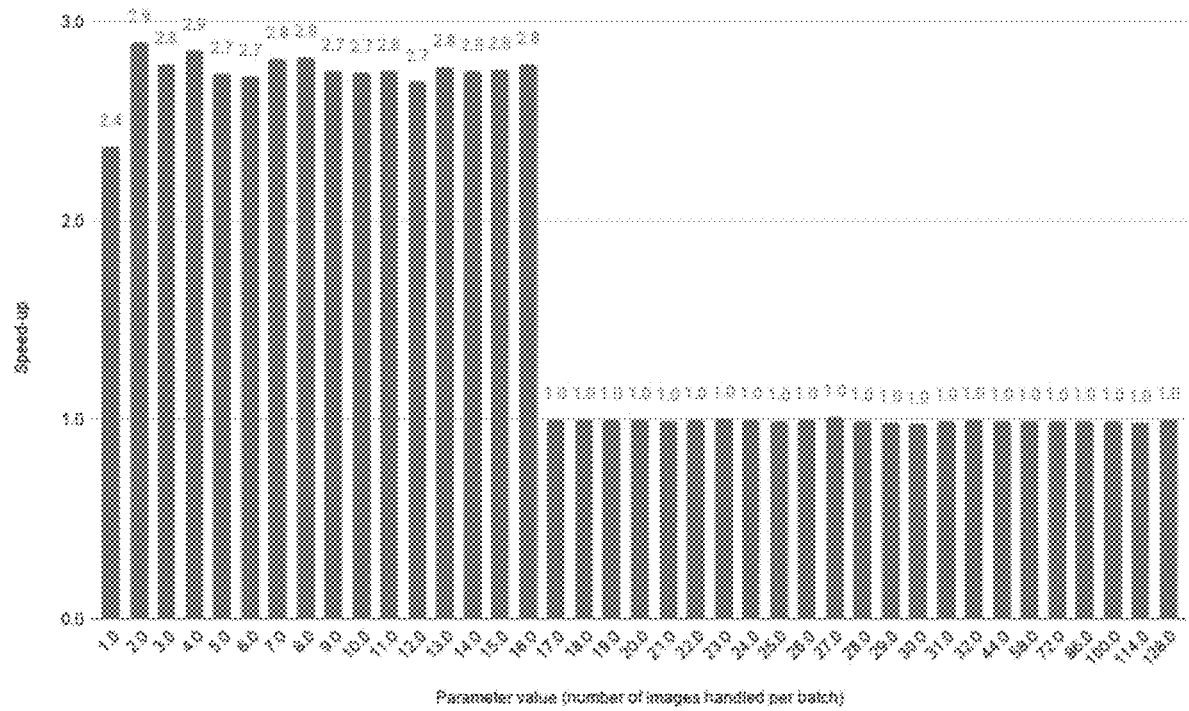
FIGS. 9 and 10 show the respective speed-ups in the execution of another example source code, due to versioning of that source code according to two different embodiments.
Figure 10:
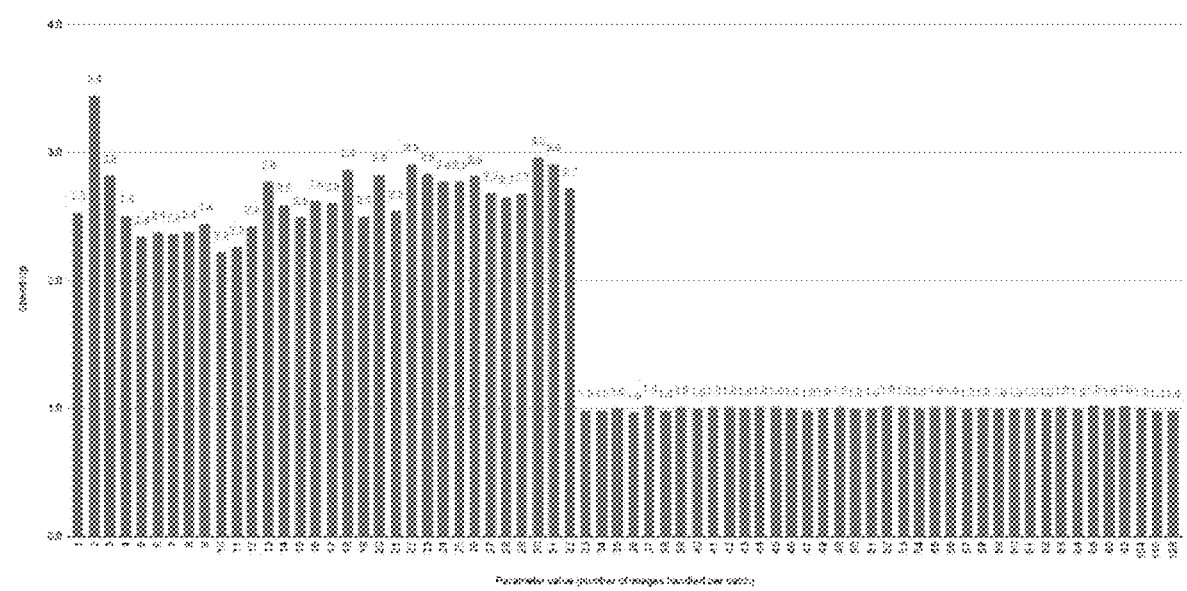
Figure 11:
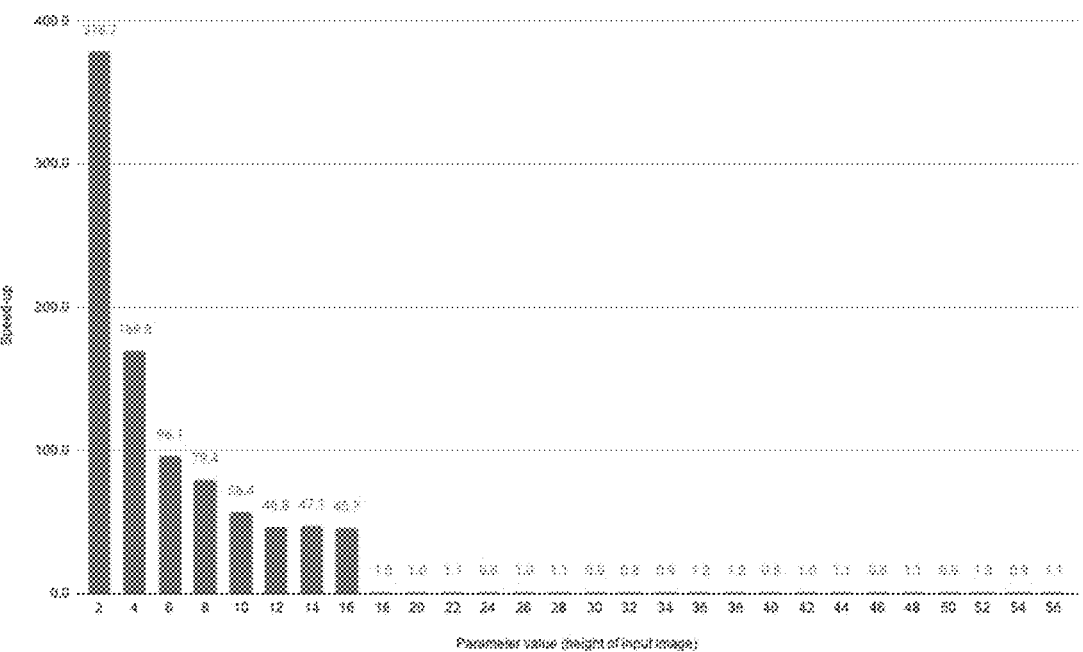
FIGS. 11 and 12 show the respective speed-ups in the execution of yet another example source code, due to versioning of that source code according to two different embodiments.
Figure 12:
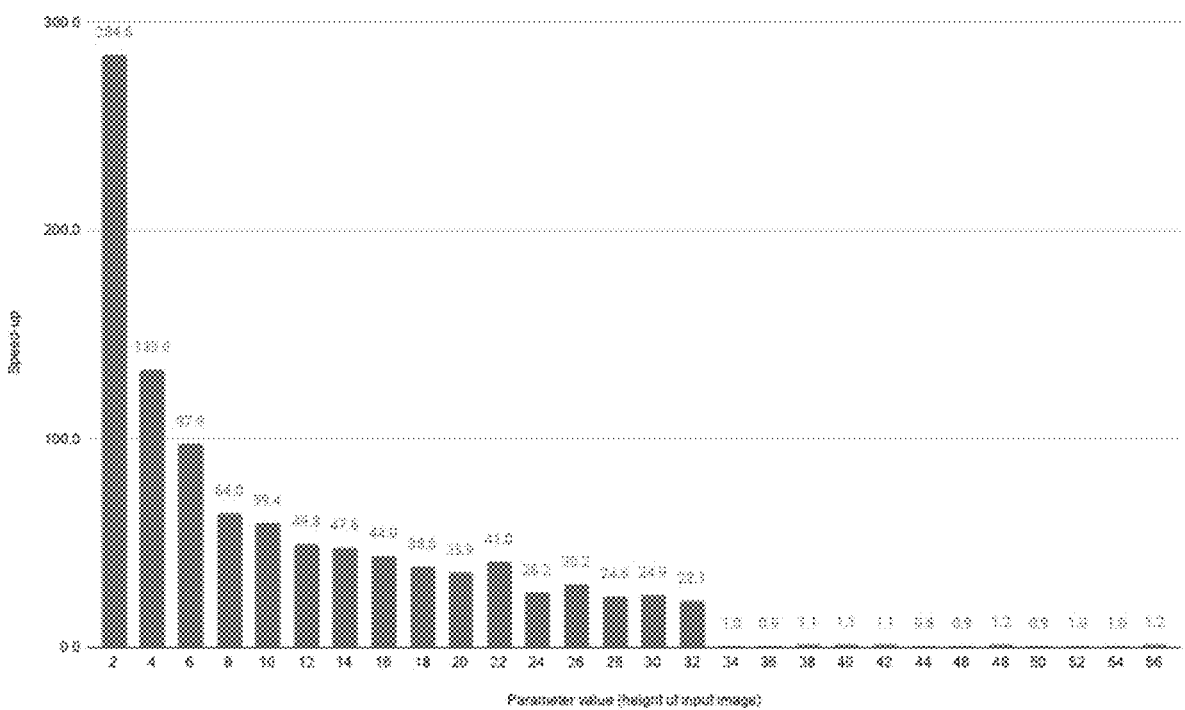

The random-looking speedups are due to the low absolute computation time, leading to higher performance variability, and to penalties incurred by false sharing. Setting the threshold to 32, as in FIG. 7A confirms this observation, with a smoother behavior as the absolute computation time grows. In FIGS. 7B and 8B, the speedup revolves around 1×, which confirms that the versioned code behaves like the non-versioned code (up to the remaining variability due to OpenMP), when the non-specialized GDG is selected. This is true for all the benchmarks (as seen in the right halves of FIGS. 9-12). This is not surprising, since the optimization of the non-specialized GDG is unchanged by the versioning process.

6.3.2 Convolution_Googlenet

The convolution example exposes a side-effect of choosing to restart the mapping process at the placement pass for the specialized GDG. At this stage, tiling decisions have been made, on the basis of a large number of iterations along the batch dimension. This resulted in "fat" tiles, leaving only a few iterations in the inter-tile dimensions resulting from the height and width dimensions, which are fixed in the input program. As a result, these inter-tile dimensions do not pass the occupation test and the sequential code is used.

Starting a full mapping for the specialized version would have had the potential to use these loop dimensions for placement, at the expense of a doubled mapping time. Still here, a sequential mapping performs two to three times better than a parallelization along the batch dimension for small values of the batch size.

6.3.3 Maxpool_Resnet

The scenario is slightly different for maxpool, in that the bound on the second loop (ouT_H) is parametric but linked to the value of the outermost loop (HEIGHT). In this example, the other dimensions are fixed and did not pass the occupation test. Again, we are comparing a sequential version with parallelized ones on small versions of the kernel, and they win.

6.4 Compilation Cost for Versioning

For measuring the compilation time overhead that results from versioning, for a fixed occupancy setting and microkernel, we compiled the microkernel using R-Stream+versioning and R-Stream for ten iterations, and computed the geometric mean slowdown over the ten iterations. Here is the formula we use for slowdown:

$$\frac{R\text{-Stream compilation time w/ versioning}}{R\text{-Stream compilation time w/o versioning}}$$

Figure 13:
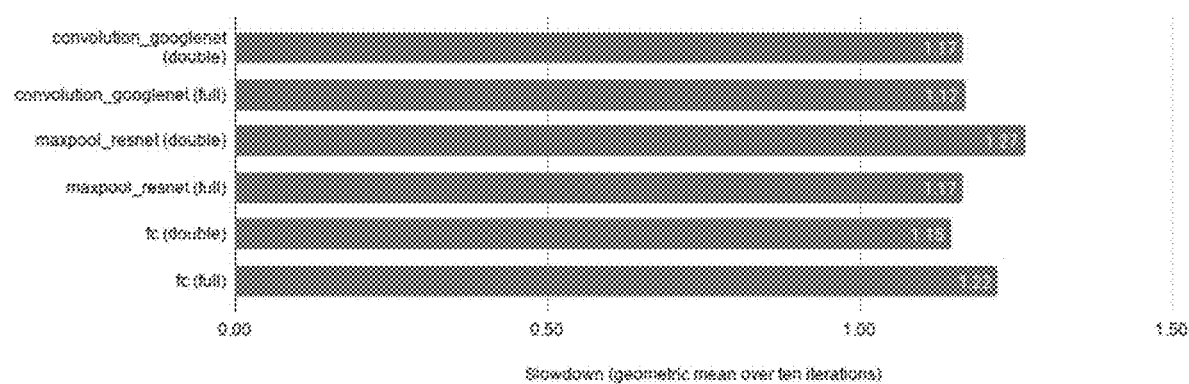
FIG. 13 the compilation time overhead due to versioning according to one embodiment.

As demonstrated by FIG. 13, the cost of compiling code with versioning turned on is not much more than compiling with just R-Stream. Depending on the nature of the source code being compiled, however, the compilation cost with versioning turned on can be significant, e.g., more than 10%, 20%, 50%, etc., relative to compiling without versioning.

CONCLUSION

We describe techniques for implementing versioning in a polyhedral compiler, where different source-code versions of a code segment containing a loop or a loop nest can be generated and compiled at compile time. The version that is most efficient according to a selected criterion or criteria (e.g., parallelization, memory locality, cache performance (e.g., due to a data-layout transformation), execution time, etc.) would be selected and executed at runtime.

In contrast to PolyJIT discussed above, in our approach the number of polyhedral compilations is not dependent upon the number of dynamic instances of a GDG's parameters.

We have presented some heuristics to reduce the overall number of conditionals being tested in the nested conditional code that defines which version is to be executed. Our work differs from the techniques that may handle nested conditionals in the genera context in that we have the advantage of knowing that all our conditionals are affine relationships and that conjunctions thereof form a polyhedral context. This allows us to drive code generation based on loose and tight inclusion relationships. Also, since we are generating these conditionals from a partition of a polyhedral context, rather than using trace or profile-based techniques, it can be more effective to compute the importance of each context at compile-time, either by using polyhedral counting methods or through polyhedral sampling of the context.

We describe the trade-offs made to avoid paying for improved run-time performance with an explosion of versions and a subsequently long compilation time. Embodiments of the overall technique described herein successfully demonstrates the usefulness of compile-time versioning in the polyhedral model. Various embodiments are presented in the context of the placement pass of polyhedral compilation, but the specialization described herein can be incorporated in various other polyhedral passes, as well.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for compiling source code, the method comprising performing by a processor the steps of:
   receiving and transforming source code comprising one or more run-time-determinable parameters into a base internal representation (IR) of a polyhedral compiler;
   creating a plurality of dedicated versions of the base IR, each dedicated version comprising a respective context that represents a distinct respective combination of potential values of the parameters;
   generating a respective source code version corresponding to each dedicated version of the base IR; and
   deriving a wrapper function for conditionally invoking the respective source code versions.

2. The method of claim 1, wherein:
   the source code comprises a loop nest, and one of the one or more run-time-determinable parameters comprises a bound of a loop in the loop nest or a memory access variable specified in the loop in the loop nest.

3. The method of claim 1, wherein:
   the base IR comprises a generalized dependence graph (GDG); and
   creating the plurality of dedicated versions of the base IR comprises creating a tree of GDGs.

4. The method of claim 1, wherein for a particular dedicated version of the base IR, a corresponding context representing a corresponding combination of the potential values of the parameters comprises a constraint function in terms of the potential values of one or more of the parameters.

5. The method of claim 4, further comprising linearizing the constraint function via affine approximation.

6. The method of claim 4, further comprising linearizing the constraint function using an artificial neural network trained for polyhedral smoothing.

7. The method of claim 1, wherein to conditionally invoke a particular source code version, the wrapper function is configured for evaluating at runtime the combination of potential values of the parameters.

8. The method of claim 7, wherein:
   the combination of potential values of the parameters is represented as a solution to a set of affine functions; and
   evaluating at runtime the combination of potential values of the parameters comprises evaluating each affine function in the set at most once.

9. A system for compiling source code, the system comprising:
   a first processor; and
   a first memory in electrical communication with the first processor, and comprising instructions that, when executed by a processing unit that comprises one or more computing units, wherein one of the one or more computing units comprises the first processor or a second processor, and wherein the processing unit is in electronic communication with a memory module that comprises the first memory or a second memory, program the processing unit to:
   receive and transform source code comprising one or more run-time-determinable parameters into a base internal representation (IR) of a polyhedral compiler;
   create a plurality of dedicated versions of the base IR, each dedicated version comprising a respective context that represents a distinct respective combination of potential values of the parameters;
   generate a respective source code version corresponding to each dedicated version of the base IR; and
   derive a wrapper function for conditionally invoking the respective source code versions.

10. The system of claim 9, wherein:
    the source code comprises a loop nest, and one of the one or more run-time-determinable parameters comprises a bound of a loop in the loop nest or a memory access variable specified in the loop in the loop nest.

11. The system of claim 9, wherein:
    the base IR comprises a generalized dependence graph (GDG); and
    to create the plurality of dedicated versions of the base IR, the instructions program the processing unit to create a tree of GDGs.

12. The system of claim 9, wherein for a particular dedicated version of the base IR, a corresponding context representing a corresponding combination of the potential values of the parameters comprises a constraint function in terms of the potential values of one or more of the parameters.

13. The system of claim 12, wherein the instructions further program the processing unit to:
  linearize the constraint function via affine approximation.

14. The system of claim 12, wherein the instructions further program the processing unit to:
  linearize the constraint function using an artificial neural network trained for polyhedral smoothing.

15. The system of claim 9, wherein to conditionally invoke a particular source code version, the wrapper function is configured for evaluating at runtime the combination of potential values of the parameters.

16. The system of claim 15, wherein:
  the combination of potential values of the parameters is represented as a solution to a set of affine functions; and
  evaluating at runtime the combination of potential values of the parameters comprises evaluating each affine function in the set at most once.

* * * * *